Dec. 30, 1941.  A. D. RAPUANO  2,268,083
TEMPERATURE REGULATOR FOR INTERNAL COMBUSTION ENGINES
Filed July 31, 1939
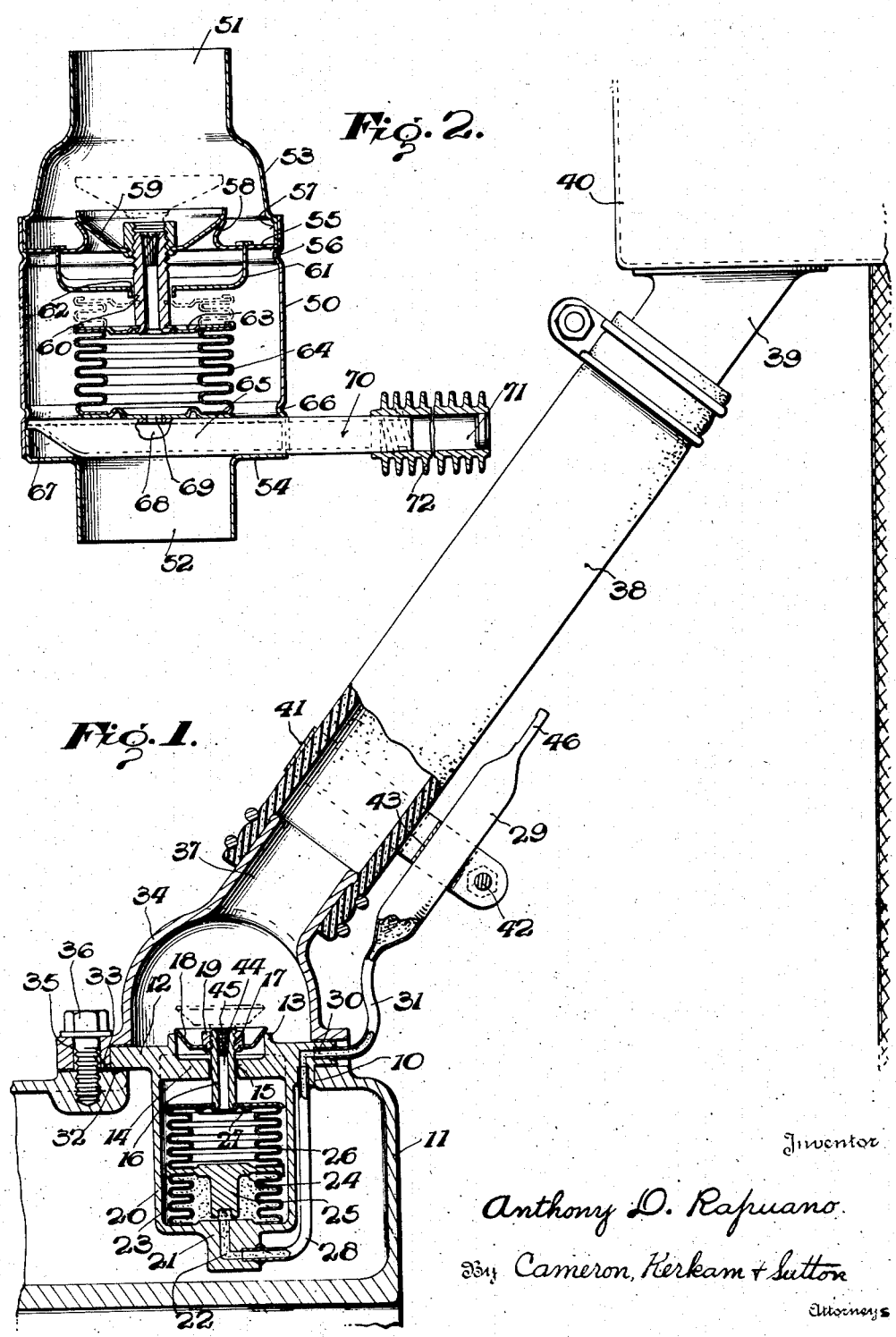
Inventor
Anthony D. Rapuano.
By Cameron, Kerkam + Sutton
Attorneys Patented Dec. 30, 1941

2,268,083

UNITED STATES PATENT OFFICE 2,268,083

TEMPERATURE REGULATOR FOR INTERNAL COMBUSTION ENGINES

Anthony D. Rapuano, New Haven, Conn., assignor to Bridgeport Thermostat Company, Inc., Bridgeport, Conn., a corporation of Delaware Application July 31, 1939, Serial No. 287,626

7 Claims. (Cl. 236—34)

This invention relates to temperature regulators, and more particularly to temperature regulators for the cooling systems of internal combustion engines.

Various forms of temperature regulators for the cooling systems of internal combustion engines have heretofore been proposed, such regulators ordinarily including a thermostat which responds to the temperature of the cooling medium to vary its flow through the system or to operate shutters or the like for controlling the flow of air through the radiator. It has also been proposed to regulate the effect of the cooling system by means of a thermostat subjected to the temperature of the air under the hood, but such have not been found satisfactory and little or no use of thermostats subjected only to air temperature has been made. Thermostats subjected to the cooling water respond promptly to variations in temperature therein, but experience has demonstrated that engines frequently overheat in warm weather because of delayed dissipation of heat from the cooling system, while in very cold weather engines are likely to be overcooled because of too rapid dissipation of heat from the cooling system.

It is an object of this invention to overcome the foregoing difficulties by providing a temperature regulator which responds to the temperature of the water or other cooling medium in the circulatory system and which also automatically compensates for variations in air temperature, i. e., when the outside temperature is low so that an excessive dissipation of heat from the cooling system is likely to occur, the thermostatically operated valve is delayed in its opening until a higher temperature of the cooling medium is reached, while when the air temperature is higher, the thermostatically operated valve opens at a lower temperature of the cooling medium, thereby tending to maintain the temperature of the engine under all conditions more nearly that which is preferred.

Another object of the present invention is to provide a device of the type characterized which responds both to the temperature of the cooling medium and to the temperature of the air so as to control the temperature of the cooling system in accordance with a predetermined combined effect of the said temperatures, whereby a compensation for variations in air temperature is introduced into the control which is otherwise responsive to the temperature of the cooling medium.

Another object of this invention is to provide a device of the type characterized which is simple in construction, inexpensive to manufacture and install, and efficient and certain in operation.

Other objects will appear as the description of the invention proceeds.

While the present invention is susceptible of embodiment in temperature regulators of a wide variety of types and for controlling different forms of temperature modulating elements, the invention has particular utility in connection with temperature regulators of the so-called "choker" type wherein a single valve in the cooling system is designed to prevent circulation of the cooling medium through the system until the temperature of the cooling medium has attained a predetermined degree, whereupon the regulator starts to open to increase the circulation in order to maintain the temperature relatively constant. As it is desirable to initiate the valve opening movement at a higher temperature when the air temperature is low, so as to compensate, at least in part, for the greater differential in temperatures and therefore the greater rate of heat dissipation under such conditions, the present invention has particular utility in automatically varying the temperature at which the thermostat is designed to initiate the opening of the choker valve. Therefore the present invention will be described by reference to certain embodiments thereof of the choker type of regulator, but it is to be expressly understood that in its broader aspects the invention is not restricted to this type of embodiment, as will be apparent to those skilled in the art.

The invention is capable of receiving a variety of mechanical expressions, some of which are shown on the accompanying drawing, but it is to be understood that the drawing is for purposes of illustration only and is not to be construed as a definition of the limits of the invention, reference being had to the appended claims for that purpose.

Referring in detail to the accompanying drawing, wherein corresponding reference characters are employed to designate corresponding parts in the several figures, Fig. 1 is an elevation, partly in section, of one embodiment of the present invention; and Fig. 2 is an axial section of a second embodiment.

Referring first to Fig. 1, the invention is shown as incorporated in a temperature regulator mounted in an aperture 10 suitably provided in the wall of the cooling jacket 11, but it is to be expressly understood that the embodiment now to be described can equally well be incorporated in a structure designed to be introduced into a water line, by providing a housing having nipples at its opposite ends as in the embodiment of Fig. 2, or this embodiment could be mounted for projection into a radiator or any other suitable element of the cooling system. Similarly, the embodiment illustrated in Fig. 2, as of the type for introduction into a water line, may by obvious change be provided in the form for introduction through an aperture in the cooling water jacket, as in the embodiment of Fig. 1, or for introduction through an aperture in the radiator, etc.

In the form shown in Fig. 1, the temperature regulator includes a flanged end plate 12 provided in any suitable way with a valve seat, as by an upstanding flange 13. End plate 12 has a spider or bridge 14 which is centrally apertured at 15 to receive and guide the valve stem 16. Mounted on said stem 16 in any suitable way, as by a threaded connection at 17, is a valve member of any suitable form, here shown as a dished sheet metal element 18 suitably secured to a hub 19 threaded, as before referred to, onto said stem 16.

Depending from the flanged plate 12, and formed integrally therewith or otherwise suitably attached thereto, is a thermostat support which may take the form of a strap 20, or a suitably apertured cylindrical casing, or be of any other suitable form such as known to the art. The lower portion of said support 20 has formed integrally thereon or suitably attached thereto a block 21 provided with a passage 22 extending therethrough. Suitably attached to the support 20 so as to provide a hermetic seal therewith is an expansible and collapsible corrugated tubular metal wall 23 to whose opposite end is hermetically sealed in any suitable way a plate 24, here shown as having a centrally arranged downwardly extending projection 25. Also, hermetically sealed to plate 24 is a second expansible and collapsible corrugated tubular metal wall 26 to which is hermetically sealed at its opposite end an end wall 27 having secured thereto in any suitable way the inner end of the valve stem 16.

Secured to the block 21 in any suitable way is a capillary tube 28 which communicates with the passage 22 at one end and which leads to a bulb 29 subjected to the temperature of the air. As here shown the capillary tube 28 leads to a passage 30 formed in the end plate 12, and communicating with the other end of passage 30 is a second capillary tube 31 leading to the bulb 29. The ends of the tubes 28 and 31 are hermetically sealed in communication with the ends of the passages 22 and 30, and the bulb 29 is hermetically sealed to or formed integrally with the tube 31.

End plate 12 is mounted in the aperture 10 in any suitable way. As here shown, the flange thereof is mounted on a seat 32 surrounding the aperture 10 and said end plate is secured in position, preferably with an interposed washer 33, by a dome-shaped cover plate 34 having a flange in which is a suitable number of apertures 35 through which bolts or screws 36 extend into threaded apertures in the wall of the jacket 11. Cover plate 34 has an outlet nipple 37 to which is secured in any suitable way a conduit 38, which may be a piece of rubber hose, leading to the inlet 39 of a radiator 40. Bulb 29 may be conveniently supported from the tube 38 and to this end is shown as mounted thereon by means of a clip 41 clamped about tube 38, as by a bolt and nut 42, and provided with a seat 43 for the bulb 29.

The two expansible and collapsible walls 23 and 26 with their end walls constitute a pair of expansible and collapsible chambers mounted in tandem, the wall 24 being common to both. Bellows 26 may be charged with any suitable liquid, such as alcohol, to provide the desired temperature to initiate the opening of the valve member 18. Said bellows may be charged through an aperture 44 provided in the stem 16 and sealed by the plug of solder indicated at 45. The second bellows 23, together with its bulb 29 and the intermediate tubing and passages, is charged with a second volatile liquid which is more volatile than the liquid in the bellows 26. The thermostat constituted by the bulb 29 and bellows 23 with the intermediate passages and tubing may be conveniently filled through the end of the bulb 29, as by means of the tubing 46 which is then sealed in any suitable way. The charges of the two thermostats so constituted are so selected as to provide a predetermined variation in the temperature at which the thermostat 26 initiates the opening movement of the valve member 18, depending upon the condition existing in the thermostat 23, constituting a movable abutment for the thermostat 26 as determined by the temperature to which the bulb 29 is subjected.

Assume that at an outside temperature of say 60° F. the charge in the thermostat 26 will initiate the opening of the valve member 18 when the cooling water has attained a temperature of 140° F. If the outdoor temperature is relatively low, say 10° above zero, the volatile fluid in the thermostat including the bulb 29 and the bellows 23 will be at a low vapor pressure whereby the bellows 23 tends to contract, pulling the thermostat 26 downwardly as viewed in Fig. 1, and holding the valve member 18 against its seat with an additional tension. When the cooling water warms up, the additional tension thus imposed by thermostat 26 on the valve member cannot be overcome until such a vapor pressure has been developed in the thermostat 26 as will correspond with a water temperature of say 150° F. If the outside temperature rises to 60° F., however, the vapor pressure in the thermostat including the bulb 29 and bellows 23 will increase tending to expand the bellows 23 and thereby decreasing the tension with which the thermostat 26 holds the valve member 18 against its valve seat. Thus the thermostat 26 may initiate the opening movement of the valve member 18 when the designed temperature of say 140° F. in the cooling water has been reached. At intermediate temperatures intermediate conditions will prevail, and thus the compensating effect of air temperature will operate automatically to vary the temperature at which the valve opening movement is initiated in response to the temperature of the cooling water.

It is to be expressly understood that the temperatures assumed have been taken for purposes of illustration only, as it is apparent that by suitably selecting the charges of the two thermostats the temperatures at which the valve opening movement is initiated may be varied through predetermined limits for predetermined variations in the temperature of the air and of the cooling water.

The embodiment of Fig. 2 employs a single thermostat. As here shown, the temperature regulator is mounted in a housing 50 provided with nipples 51 and 52 at its opposite extremities for attachment to hose line sections. As here shown, the housing has its nipples 51 and 52 formed on separate end pieces 53 and 54 which are attached to the cylindrical body of the housing in any suitable way. Mounted within the housing 50 is a partition member 55, here shown as secured in position by means of a bead 56 on the housing 50 and the inwardly extending sleeve portion 57 on the end member 53. Partition 55 is formed in any suitable way to provide a valve seat, as by providing an axially directed flange 58 thereon surrounding the valve port. Cooperating with said flange 58 is a valve member 59 which may be of any suitable form such as shown in Fig. 1 and therefore shown as a dished sheet metal member threadedly attached to a valve stem 60 which passes through a spider or strap 61 suitably attached to partition 55 and provided with a central aperture 62 for guiding the valve stem.

Attached to the valve stem 60 is the end wall 63 of a thermostat formed by an expansible and collapsible tubular corrugated metal wall or bellows 64 hermetically sealed in any suitable way to said end wall 63 and having its opposite end similarly sealed to an end member 65 which may be secured in the housing 50 in any suitable way as by being clamped between the bead 66 and the inwardly extending sleeve portion 67 on the end member 54. End member 65 has a passage 68 which communicates with the interior of the bellows 64 through an aperture 69, said passage 68 also extending to and communicating with a tubular member 70 which may be formed integrally with member 66 or suitably attached thereto, said tubular member 70 leading to a bulb 71, here shown as provided with a plurality of heat radiating fins 72, mounted in any suitable way so as to be subjected to the temperature of the air.

The thermostat composed of said bulb 71, bellows 64 and communicating tubular passages 68, 70, is charged with any suitable volatile fluid as alcohol. Thus when the outside air temperature surrounding the bulb 71 is say 70° F. and the water flowing through the housing 50 is at say 150° F. the valve starts to open. If the outside temperature, however, is down to 0° F. the lower vapor pressure by reason of the subjection of the bulb 71 to said air temperature is productive of a lower vapor pressure within the thermostat so that a higher temperature of the cooling water is required before a sufficient vapor pressure is built up to initiate the opening movement of the valve. Thus, by way of example, a temperature of 160° F. instead of 150° F. may be required to initiate the valve opening movement when the air temperature is as suggested at 0° F. It is to be expressly understood, however, that the temperatures so suggested have been selected for purposes of illustration only.

It will therefore be perceived that by the present invention a temperature regulator has been provided which, while responsive to variations in the temperature of the cooling medium to initiate the opening of the valve, is also subjected to the compensating effect of variations in air temperature, so that at a relatively low air temperature initiation of the valve opening movement is retarded to assure a higher temperature of the cooling medium before the valve opens, while at higher air temperatures a lower temperature of the cooling medium will initiate the valve opening movement. Hence a compensation is introduced for the greater temperature differential existing at low air temperatures, with the consequent increase in rate of heat dissipation, while at warm air temperatures a lower cooling medium temperature is maintained to prevent overheating of the engine when the rate of heat dissipation is less. At the same time, this compensating action is obtained without undue complexity, the regulator being of a relatively simple, compact and rugged construction, inexpensive to manufacture and easy to install.

While the invention has been illustrated as embodied in structures of the choker type employing a poppet valve operated by a bellows thermostat, it is to be understood that the invention is not restricted thereto, as it may be incorporated in regulators of the type employing by-pass valves as well as regulators of other form; butterfly and other forms of valve members may be used; and other forms of thermostats may be employed. Also, other constructions obtaining the compensating effect for variations in air temperature may be employed within the principles hereinbefore set forth, and therefore while the embodiments of the present invention illustrated on the drawing have been described with considerable particularity, it is to be expressly understood that the invention is not restricted thereto, as the same may take a variety of mechanical expressions, as will now be apparent to those skilled in the art, while changes may be made in the details of construction, arrangement and proportion of parts, and certain features may be used without other features, without departing from the spirit of this invention.

While for purposes of exemplification certain temperatures have been referred to, it is to be expressly understood that the invention is not restricted to the use of any particular temperatures, as the desired operating temperatures of the engine in warm and cold weather will vary with the engine. By suitably selecting the volatile liquid or liquids employed, the desired range of temperature and the desired upper and lower limits of temperature at which the thermostatically operated valve starts to open at warm and cold air temperatures may be selected to obtain the desired differential in the response of the thermostat to varying air temperatures. Reference is therefore to be had to the appended claims for a definition of this invention.

What is claimed is:

1. In a temperature regulator for internal combustion engines having a system through which a cooling medium is circulated in heat interchanging relation with the engine, means for controlling the flow of cooling medium therethrough including a valve member for opening and closing a valve port, and thermostatic means operatively connected to said valve member and subjected to the temperature of the cooling medium, said thermostatic means including a pair of separate chambers charged with thermosensitive medium and respectively responsive to the temperature of the cooling medium and the temperature of the air, the first of said chambers having a movable end wall operatively connected to the valve member and the other of said chambers being operatively related to said first-named chamber to adjust the same in response to variations of air temperature.

2. In a temperature regulator for internal combustion engines having a system through which a cooling medium is circulated in heat interchanging relation with the engine, means for controlling the flow of cooling medium therethrough including a valve member for opening and closing a valve port, and thermostatic means operatively connected to said valve member and subjected to the temperature of the cooling medium, said thermostatic means including a pair of separate chambers charged with thermosensitive medium and respectively responsive to the temperature of the cooling medium and the temperature of the air, the first of said chambers having a movable end wall operatively connected to the valve member and the other of said chambers being operatively related to said first-named chamber for adjusting the same and including an extension projecting exteriorly of said system for direct subjection to the temperature of the air.

3. In a temperature regulator for internal combustion engines having a system through which a cooling medium is circulated in heat interchanging relation with the engine, means for controlling the flow of cooling medium therethrough including a valve member for opening and closing a valve port, and thermostatic means operatively connected to said valve member and subjected to the temperature of the cooling medium, said thermostatic means including a pair of separate chambers charged with thermosensitive medium and respectively responsive to the temperature of the cooling medium and the temperature of the air, the first of said chambers having a movable end wall operatively connected to the valve member and the other of said chambers constituting a movable abutment for said first-named chamber and operating to adjust the position of said chamber and its connected valve member with respect to said port upon variations in the temperature of the air.

4. In a temperature regulator for internal combustion engines having a system through which a cooling medium is circulated in heat interchanging relation with the engine, means for controlling the flow of cooling medium therethrough including a valve member for opening and closing a valve port, and thermostatic means operatively connected to said valve member and subjected to the temperature of the cooling medium, said thermostatic means including a pair of separate expansible and collapsible chambers respectively charged with volatile fluid, one of said chambers being directly subjected to the temperature of the cooling medium and having a movable end wall operatively connected to said valve member and the other of said chambers having an extension directly subjected to the temperature of the air and a movable end wall for adjusting said first-named chamber.

5. In a temperature regulator for internal combustion engines having a system through which a cooling medium is circulated in heat interchanging relation with the engine, means therein for controlling the flow of cooling medium therethrough including a valve member for opening and closing a valve port, and thermostatic means operatively connected to said valve member and subjected to the temperature of the cooling medium, said thermostatic means including a pair of separate expansible and collapsible chambers respectively charged with volatile fluid, one of said chambers being directly subjected to the temperature of the cooling medium and having a movable end wall operatively connected to said valve member and the other of said chambers having an extension directly subjected to the temperature of the air and a movable end wall which constitutes a movable abutment for said first-named chamber.

6. In a temperature regulator for internal combustion engines having a system through which a cooling medium is circulated in heat interchanging relation with the engine, means for controlling the flow of cooling medium therethrough including a valve member for opening and closing the valve port, and thermostatic means operatively connected to said valve member and subjected to the temperature of the cooling medium, said thermostatic means including an expansible and collapsible chamber charged with a volatile liquid and operatively connected to said valve member, said chamber being subjected to the temperature of said cooling medium, and means for modifying the action of said first-named chamber to increase the temperature at which said thermostatic means responds to the temperature of the cooling medium when the air temperature is relatively low and including a second expansible and collapsible chamber charged with a volatile liquid of lower boiling point, said second-named chamber constituting a movable abutment for said first-named chamber and having means whereby its vapor pressure is changed with varying temperatures of the air.

7. In a temperature regulator for internal combustion engines having a system through which a cooling medium is circulated in heat interchanging relation with the engine, means for controlling the flow of cooling medium therethrough including a valve member for opening and closing the valve port, thermostatic means operatively connected to said valve member and subjected to the temperature of the cooling medium, said thermostatic means including an expansible and collapsible chamber charged with a volatile liquid and operatively connected to said valve member, said chamber being subjected to the temperature of said cooling medium, and means for modifying the action of said first-named chamber to increase the temperature at which said thermostatic means responds to the temperature of the cooling medium when the air temperature is relatively low and including a second expansible and collapsible chamber charged with a volatile liquid of lower boiling point and constituting a movable abutment for said first-named chamber, said second-named chamber having a bulb in open communication therewith disposed exteriorly of said system where it is directly subjected to the temperature of the air.

ANTHONY D. RAPUANO.